Sept. 1, 1931.  W. J. RUDOLPH  1,821,669
GAUGE CONSTRUCTION
Filed Nov. 19, 1925
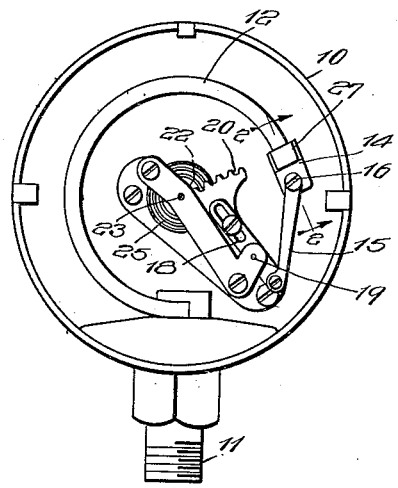
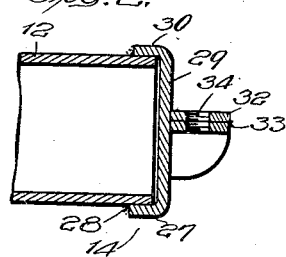
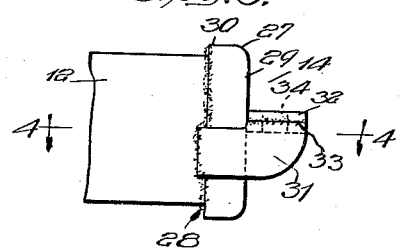
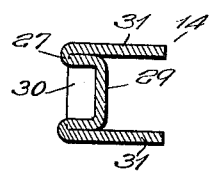
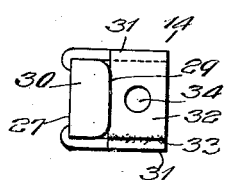
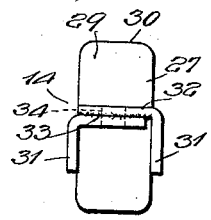
Witnesses:
William R. Kilroy
Harry R. L. White
Inventor:
Walter J. Rudolph
By Hill & Hill
Attys Patented Sept. 1, 1931

1,821,669

UNITED STATES PATENT OFFICE

WALTER J. RUDOLPH, OF CHICAGO, ILLINOIS, ASSIGNOR TO JAS. P. MARSH & COMPANY, OF CHICAGO, ILLINOIS, A CORPORATION OF ILLINOIS

GAUGE CONSTRUCTION

Application filed November 19, 1925. Serial No. 70,066.

My invention relates to gauges and particularly to gauges of the Bourdon tube type. My invention has among its other objects the production of a device of the kind described which is convenient, compact, durable, efficient and satisfactory for use wherever found applicable.

A particular object of the invention is to provide improved means for closing the free end of the Bourdon tube.

Another particular object of the invention is to provide improved means for operatively connecting a Bourdon tube to the indicating mechanism of a gauge.

One form of the invention is embodied in a gauge for indicating pressure or vacuum. The gauge comprises a Bourdon tube having one of its ends fixed to the casing of the gauge and communicating with the usual conduit and having its other end operatively connected to the indicating mechanism of the gauge. The free end of the tube is sealed by an improved closure member preferably formed or stamped from sheet metal. In the illustrated embodiment of the invention, the improved closure member comprises a cap soldered to the free end of the tube and provided with one or more integral ears disposed at opposite sides of the cap, the ears in the preferred construction forming a lug of superimposed layers of metal which are preferably soldered to each other. Pivoted to the lug is a link which connects the free or movable end of the Bourdon tube to the indicating mechanism of the gauge.

Many other objects and advantages of the construction, herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevation of a gauge embodying the invention, the dial, bezel and indicating hand having been removed to show the mechanism of the gauge in which the invention is embodied;

Fig. 2 is an enlarged section taken on line 2—2 of Fig. 1;

Fig. 3 is an enlarged side view of a closure member provided for a Bourdon tube which forms part of the new gauge shown in Fig. 1, the closure member being shown in connection with the free end of the Bourdon tube;

Fig. 4 is a section taken on line 4—4 of Fig. 3;

Fig. 5 is a detail view of the closure member; and

Fig. 6 is an end view of the closure member.

Referring for the present to Fig. 1, wherein I have shown a gauge embodying a preferred form of the invention, the reference character 10 designates generally a casing adapted to enclose the mechanism of the improved gauge. Projecting from the casing 10 is a screw-threaded hollow fitting 11 whereby the gauge may be operatively connected to any system or apparatus in connection with which the gauge is to be used. The inner end of the fitting 11 communicates with one end of a Bourdon tube 12, this end of the Bourdon tube being fixed with respect to the casing 10 and the fitting 11.

The free end of the Bourdon tube 12 is sealed by an improved closure member 14 to which a link 15 is pivoted by a screw 16. The link 15 is pivotally connected to a lever 18, which is pivoted intermediate its ends as at 19. The lever 18 is provided with gear teeth 20 meshing with a pinion 22 mounted upon a rotatably journaled pin 23. The indicating hand (not shown) of the gauge is fixed to the pin 23 and is urged toward the zero position by a spiral or hair spring 25 having one of its ends secured to the pin 23 and having the other of its ends fixed with respect to the casing 10.

Briefly, the operation of the above described apparatus is substantially as follows: When the pressure in the system or apparatus to which the improved gauge is connected varies, the Bourdon tube 12 responds thereto in the manner well known to those skilled in the art. The movement of the Bourdon tube 12 is communicated to the indicating hand (not shown) through the link 15, the lever 18 and the pin 23.

My invention is limited to the above described details of construction only to the extent defined in the appended claims.

The improved closure member 14 is preferably stamped from sheet metal and preferably comprises a cap 27 fitted over the free end of the Bourdon tube 12, the cap being preferably soldered to the tube as indicated at 28. The cap 27 is preferably formed with a flat wall 29 having a continuous marginal flange 30 adapted to be slipped over the free end of the tube 12. Formed integral with the cap 27 are one or more ears 31 which are preferably continuations or extensions of the flange 30. The ears 31 are preferably bent back to lie against the flange 30 and their free ends are preferably bent toward and against each other to form a lug 32 comprising superimposed layers of metal. The layers of metal forming the lug 32 are preferably soldered to each other as indicated at 33. In the illustrated embodiment of the invention, the lug 32 is provided with a tapped hole 34 adapted to receive the aforementioned screw 16, whereby the link 15 is pivotally connected to the closure member 14.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A member providing a closure for the free end of a Bourdon tube, said member comprising a cap having a flange adapted to encircle the tube, and ears formed integral with the cap as extensions of said flange at opposite sides thereof and superimposed upon each other to form a lug.

2. A closure member for the free end of a Bourdon tube, said member comprising a cap having a marginal flange to surround said free end, and apertured ears integral with said flange and extending therefrom at opposite sides of the cap, said ears being formed as extensions of said flange and being superimposed upon each other to form a lug whereby the Bourdon tube may be connected to the indicating mechanism of a gauge.

3. A member providing a closure for the free end of a Bourdon tube, said member comprising a cap having a marginal flange to surround said free end, and an apertured ear integral with said flange and extending therefrom, said ear being bent parallel to said flange and providing a lug projecting from said cap whereby the Bourdon tube may be connected to the indicating mechanism of a gauge.

4. A member providing a closure for the free end of a Bourdon tube, said member comprising a cap having a marginal flange to surround said free end, and an apertured ear integral with said flange and extending therefrom, said ear being bent parallel to said flange and extending across said cap so as to provide a projecting lug whereby the Bourdon tube may be connected to the indicating mechanism of a gauge.

In testimony whereof, I have hereunto signed my name.

WALTER J. RUDOLPH.